(12) United States Patent
Ke et al.

(10) Patent No.: US 8,711,558 B2
(45) Date of Patent: Apr. 29, 2014

(54) ELECTRONIC DEVICE

(75) Inventors: Fa-Chih Ke, Taipei (TW); Chih-Hsien Lin, Taipei (TW)

(73) Assignee: Inventec Corporation, Taipei ( * ) Notice: Subject to any disclaimer, the term of this patent is extended or adjusted under 35 U.S.C. 154(b) by 368 days.

(21) Appl. No.: 13/157,687

(22) Filed: Jun. 10, 2011

(65) Prior Publication Data

US 2012/0262851 A1      Oct. 18, 2012

(30) Foreign Application Priority Data

Apr. 18, 2011   (TW) .............................. 100113393 A

(51) Int. Cl.
  *G06F 1/16*       (2006.01)
(52) U.S. Cl.
  CPC ........................................ *G06F 1/16* (2013.01)
  USPC .................... 361/679.58; 361/679.01; 292/37
(58) Field of Classification Search
  CPC ........ G06F 1/16; G06F 1/1626; G06F 1/1628
  USPC ............. 361/679.17, 679.08, 679.09, 679.21,
                361/679.01, 679.02; 248/917–924;
                312/223.1–223.2
  See application file for complete search history.

(56) References Cited

U.S. PATENT DOCUMENTS

| | | | |
|---|---|---|---|
| 7,929,283 B2 * | 4/2011 | Wang | 361/679.17 |
| 8,531,831 B2 * | 9/2013 | Ho et al. | 361/679.55 |
| 2002/0085343 A1 * | 7/2002 | Wu et al. | 361/683 |

FOREIGN PATENT DOCUMENTS

| | | |
|---|---|---|
| TW | M253810 | 12/2004 |
| TW | 200809890 | 2/2008 |

* cited by examiner

*Primary Examiner* — Jinhee Lee
*Assistant Examiner* — Ingrid Wright
(74) *Attorney, Agent, or Firm* — CKC & Partners Co., Ltd.

(57) ABSTRACT

An electronic device includes a case, a plate, and a detachable member. The case has a first receiving area, a second receiving area, and a movable latch. The first receiving area is adjacent to the second receiving area. The movable latch moves back and forth between the first receiving area and the second receiving area. The detachable member is assembled to the first receiving area. The plate is assembled to the second receiving area. When the movable latch is located in the first receiving area, the movable latch locks the detachable member to the case. When the movable latch moves to the second receiving area, the movable latch is locked to the plate.

9 Claims, 3 Drawing Sheets

ELECTRONIC DEVICE

CROSS-REFERENCE TO RELATED APPLICATION

This application claims the priority benefit of Taiwan application ser. no. 100113393, filed Apr. 18, 2011. The entirety of the above-mentioned patent application is hereby incorporated by reference herein and made a part of this specification.

BACKGROUND OF THE INVENTION

1. Field of the Invention

The invention relates to an electronic device. More particularly, the invention relates to an electronic device having a detachable member.

2. Description of Related Art

With continuous development and progress toward science, technology, and information communication, notebook computers have been rather popular and become one of the indispensible electronic products in daily lives or in workplace. In a conventional notebook computer, a keyboard is locked to a case of the notebook computer by a screw. The processes of locking the keyboard to the case and disassembling the keyboard from the case are complicated and thus inconvenient. Besides, the keyboard is required to be removed from the notebook computer before other components (e.g., the hard disc, the central processing unit, and various interface cards) are being assembled, disassembled, maintained, or repaired. Hence, the conventional way to lock the keyboard causes inconvenience to maintenance and repair of the components, i.e., the conventional procedures of assembling, disassembling, maintaining, or repairing the components in the notebook computer are labor-consuming and time-consuming.

According to the related art, a movable latch often moves relative to the keyboard, so as to assemble the keyboard to the case or disassemble the keyboard from the case. However, when the movable latch is applied to assemble or disassemble the keyboard, a user often needs to push against the movable latch with one hand holding a tool, such that the keyboard remains retracted. The user then removes the keyboard from the notebook computer with the other hand. Said procedures are rather difficult for the user. Therefore, a distracted or inattentive user is frequently prone to inadequately apply a force during the procedures, which may result in damages to relevant components in the notebook computer. Accordingly, the process of assembling the keyboard to or disassembling the keyboard from the conventional notebook computer is inconvenient and thus requires improvement.

SUMMARY OF THE INVENTION

The invention is directed to an electronic device in which a detachable member can be assembled to or disassembled from a case without using additional tools.

In an embodiment of the invention, an electronic device that includes a case, a plate, and a detachable member is provided. The case has a first receiving area, a second receiving area, and a movable latch. The first receiving area is adjacent to the second receiving area. The movable latch is suitable for moving back and forth between the first receiving area and the second receiving area. The plate is assembled to the case and located in the second receiving area. The detachable member is assembled to the first receiving area. When the movable latch is located in the first receiving area, the movable latch locks the detachable member to the case. When the movable latch moves to the second receiving area, the movable latch is locked to the plate.

According to an embodiment of the invention, when the movable latch is locked to the plate, an orthogonal projection of the movable latch in the second receiving area is located within an orthogonal projection of the plate in the second receiving area.

According to an embodiment of the invention, when the movable latch is locked to the plate, the plate covers the movable latch in the second receiving area.

According to an embodiment of the invention, the movable latch has an elastic arm, a turning portion, and a first engaging portion. The turning portion and the first engaging portion are located on the elastic arm. The turning portion is suitable for receiving a force to drive the elastic arm, such that the first engaging portion moves back and forth between the first receiving area and the second receiving area.

According to an embodiment of the invention, the plate has a second engaging portion that extends toward the second receiving area of the case. When the movable latch moves to the second receiving area, the first and second engaging portions are engaged, such that the movable latch stops in the second receiving area.

According to an embodiment of the invention, the first engaging portion is one of a latching hole and a protrusion, and the second engaging portion is the other one of the latching hole and the protrusion.

According to an embodiment of the invention, the first engaging portion has a first inclined surface, and the second engaging portion has a second inclined surface. The first inclined surface is parallel to the second inclined surface, and the second inclined surface is located on a moving path of the first inclined surface.

According to an embodiment of the invention, the movable latch has a third engaging portion. The third engaging portion is located at one side of the elastic arm, and the turning portion and the first engaging portion are located at the other side of the elastic arm.

According to an embodiment of the invention, the detachable member has a fourth engaging portion that corresponds to the third engaging portion. When the movable latch is located in the first receiving area, the third engaging portion is engaged with the fourth engaging portion.

According to an embodiment of the invention, the electronic device further includes a battery module, and the case further has a third receiving area. The third receiving area and the first receiving area are respectively located at two sides of the case. The battery module is suitable for being assembled to the third receiving area.

To sum up, the movable latch of the case in the electronic device can move back and forth according to the embodiments of the invention. Thereby, before the detachable member is assembled to the case, the movable latch is driven by the detachable member to move toward the second receiving area and to be locked to the plate, such that the detachable member can be placed on the case. After that, the movable latch is released from the plate and moved to the first receiving area to lock the detachable member. Hence, the user can assemble the detachable member to the case or disassemble the detachable member from the case without using additional tools, and the assembly/disassembly process of the electronic device becomes less difficult and more convenient.

Other features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
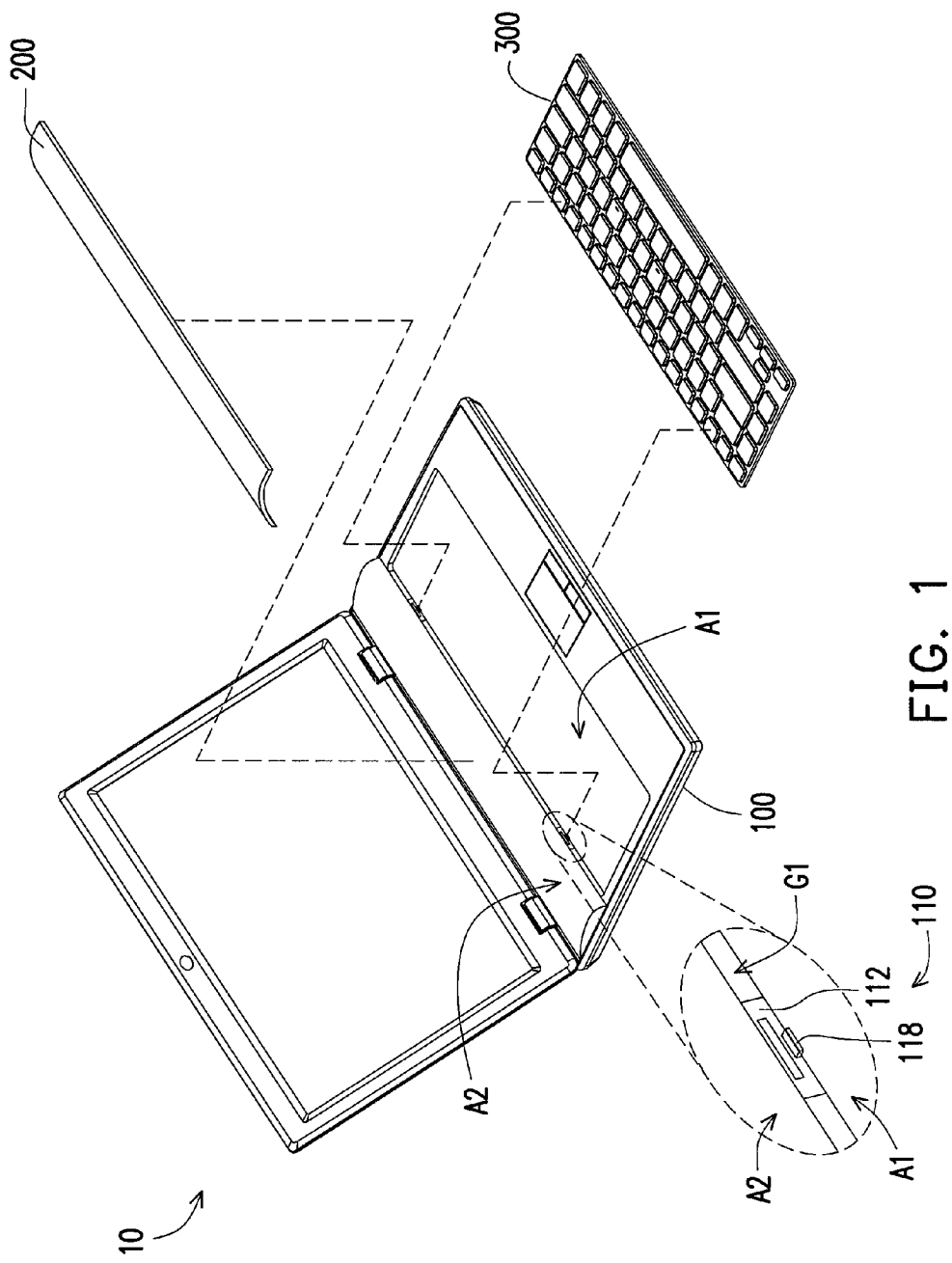
FIG. 1 is an explosive view illustrating an electronic device according to an embodiment of the invention.

FIG. 1 is an explosive view illustrating an electronic device according to an embodiment of the invention. With reference to FIG. 1, the electronic device 10 of this embodiment is a notebook computer, for instance, and the electronic device 10 includes a case 100, a plate 200, and a detachable member 300. The case 100 has a first receiving area A1, a second receiving area A2, and a movable latch 110. The first and second receiving areas A1 and A2 are adjacent to each other. The movable latch 110 is located in the first receiving area A1 and moves back and forth between the first receiving area A1 and the second receiving area A2. The plate 200 is a function-controlling panel configured on the notebook computer, for instance. Besides, the plate 200 is assembled to the case 100 and located in the second receiving area A2. The detachable member 300 is a keyboard module, for instance, and the detachable member 300 is assembled to the case 100 and located in the first receiving area A1. When the movable latch 110 is located in the first receiving area A1, the movable latch 110 locks the detachable member 300 to the case 100, so as to complete the assembly of the electronic device 100. By contrast, when the detachable member 300 is to be removed from the case 100, the movable latch 110 is moved to the second receiving area A2, such that the movable latch 110 is locked to the plate 200, and that the detachable member 300 is released from the movable latch 110.

Based on the above, the detachable member 300 can be assembled or disassembled by applying the movable latch 110 on the case 100 of the electronic device 10, and it is not necessary to use additional tools. Accordingly, the structural design of the electronic device 10 is rather simple, the assembly of the electronic device 10 is less complicated and less difficult, and the assembly or disassembly of the electronic device 10 is more convenient.

Figure 2:
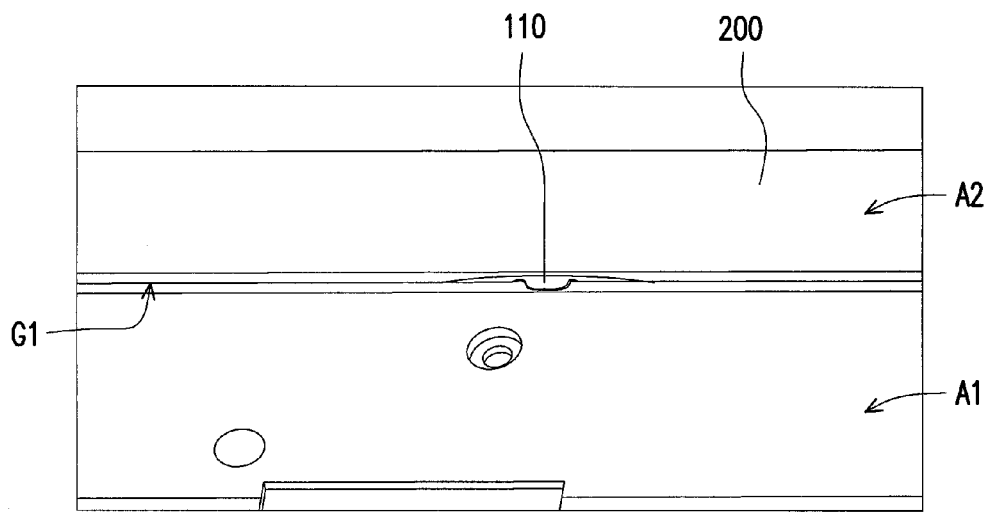
FIG. 2 is a partial top view illustrating the electronic device depicted in FIG. 1.

FIG. 2 is a partial top view illustrating the electronic device depicted in FIG. 1. In order to clearly recognize the correlation between the movable latch and the plate and the correlation between the movable latch and the detachable member, only some of the components are illustrated in the drawings, and the movable latch is enlarged. With reference to FIG. 1 and FIG. 2, in this embodiment, the second receiving area A2 is located on an edge of the first receiving area A1, and thus the detachable member 300 in the first receiving area A1 is adjacent to the plate 200 in the second receiving area A2. Therefore, the movable latch 110 located in the first receiving area A1 can either lock the detachable member 300 or lock the plate 200. When the movable latch 110 is locked to the plate 200, the orthogonal projection of the movable latch 110 in the second receiving area A2 is located within the orthogonal projection of the plate 200 in the second receiving area A2. That is to say, when the movable latch 110 is locked to the plate 200, the plate 200 substantially covers the movable latch 110 in the second receiving area A2. As observed at the viewing angle shown in FIG. 2, the movable latch 110 is hidden by the plate 200, and thus the detachable member 300 can be disassembled from the case 100 with ease. The relative position of the first and second receiving areas A1 and A2 is not limited in this embodiment. According to another embodiment not shown in the drawings, the second receiving area A2 can be any portion adjoining the first receiving area A1.

Figure 3:
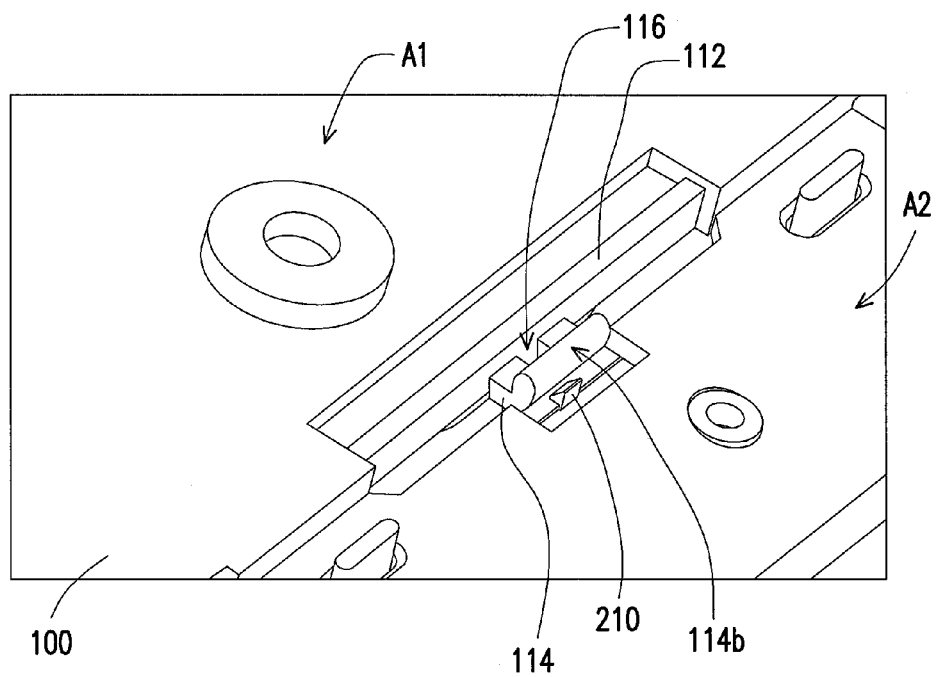
FIG. 3 is a schematic view illustrating the electronic device depicted in FIG. 2 from another viewing angle.
Figure 4A:
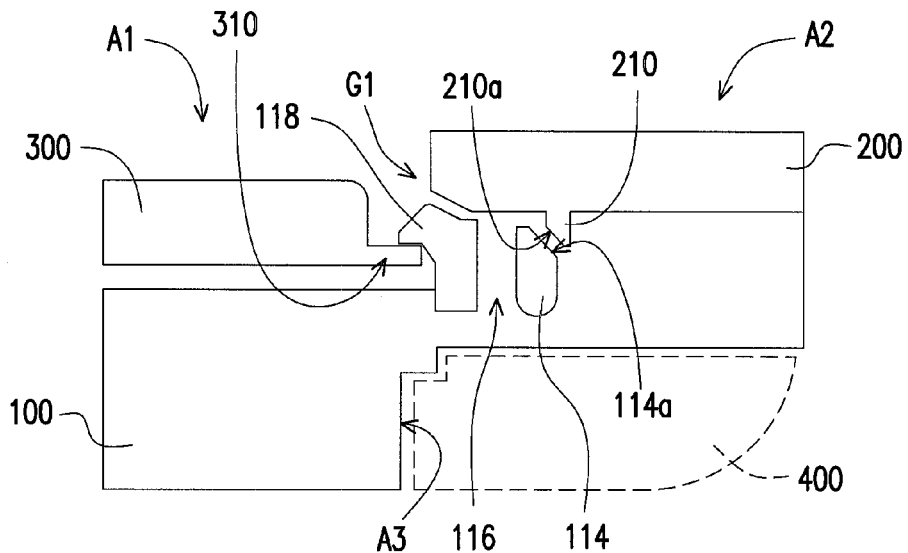
FIG. 4A and FIG. 4B are schematic views respectively illustrating assembly and disassembly of the detachable member in the electronic device depicted in FIG. 1.
Figure 4B:
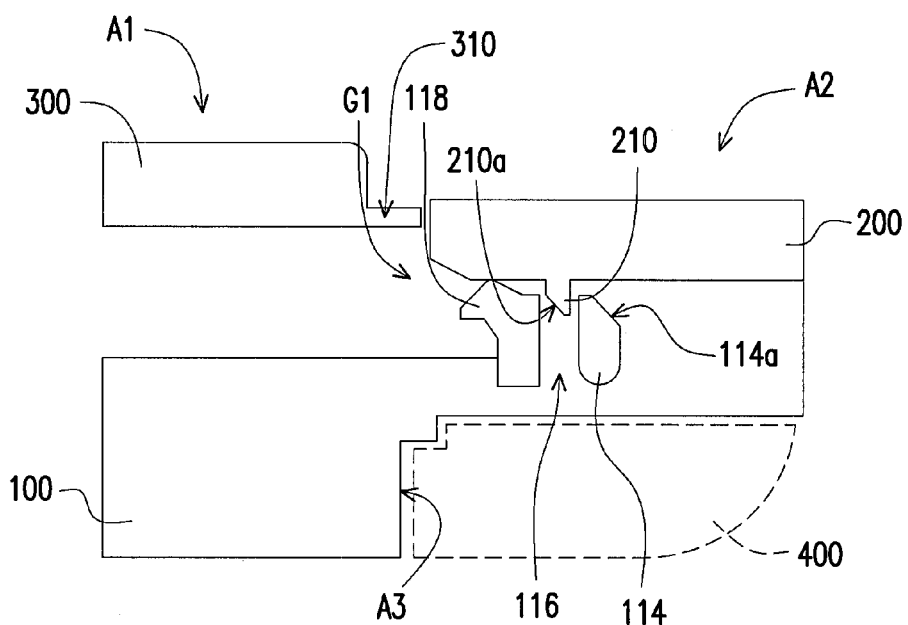

FIG. 3 is a schematic view illustrating the electronic device depicted in FIG. 2 from another viewing angle. FIG. 4A and FIG. 4B are schematic views respectively illustrating assembly and disassembly of the detachable member in the electronic device depicted in FIG. 1. Please refer to FIG. 3, FIG. 4A, and FIG. 4B. In this embodiment, there is a step height difference G1 between the first receiving area A1 and the second receiving area A2, and the movable latch 110 is located at the area where the step height difference G1 exists, such that the movable latch 110 can move back and forth between the first receiving area A1 and the second receiving area A2. Besides, when the detachable member 300 is assembled to the first receiving area A1, the detachable member 300 in the electronic device 10 can be locked to the case 100 by the movable latch 110 which can be observed from the area where the step height difference G1 exists.

To be more specific, the movable latch 110 has an elastic arm 112, a turning portion 114, a first engaging portion 116, and a third engaging portion 118. The turning portion 114 and the first engaging portion 116 are located on the elastic arm 112. According to this embodiment, the elastic arm 112 is formed by making an opening on the case 100 that is made of a plastic material. The turning portion 114 is a structure extending toward the second receiving area A2 from the elastic arm 112. The first engaging portion 116 is a latching hole located on the extending structure and between the elastic arm 112 and the turning portion 114. The third engaging portion 118 is separated from the turning portion 114 and the first engaging portion 116 by the elastic arm 112, such that the third engaging portion 118 is located at one side of the elastic arm 112, and that the turning portion 114 and the first engaging portion 116 are located at the other side of the elastic arm 112.

Thereby, when the elastic arm 112 is located in the first receiving area A1, no force is substantially exerted on the elastic arm 112. Accordingly, the movable latch 110 can lock the detachable member 300 to the first receiving area A1 of the case 100 by engaging the third engaging portion 118 with a fourth engaging portion 310 on the detachable member 300. Here, the fourth engaging portion 310 is a lip-like portion located on the edge of the keyboard, for instance.

By contrast, the user can exert a force on the turning portion 114, such that the elastic arm 112, the turning portion 114 on the elastic arm 112, and the first engaging portion 116 on the elastic arm 112 can be driven to move toward the second receiving area A2. The plate 200 has a second engaging portion 210 extending toward the second receiving area A2 of the case 100. When the movable latch 110 moves to the second receiving area A2, the first and second engaging portions 116 and 210 are engaged, such that the movable latch 110 stops in the second receiving area A2. In this embodiment, the second engaging portion 210 is a protrusion, which is conducive to engagement between the second engaging portion 210 in the second receiving area A2 and the first engaging portion 116 (i.e., the latching hole) in the second receiving area A2. When the detachable member 300 is assembled to the first receiving area A1 (or disassembled from the first receiving area A1), the user exerts a force on the turning portion 114, such that the second engaging portion 210 (i.e., the protrusion) is released from the first engaging portion 116 (i.e., the latching hole). At this time, the elastic force of the elastic arm 112 drives the first engaging portion 116 and the turning portion 114 to move back to the first receiving area A1.

The structures of the elastic arm 112, the turning portion 114, the first engaging portion 116, and the second engaging portion 118 and the way to form the structures are not limited in this embodiment. Namely, the embodiment is applicable as long as the movable latch 110 can be locked to the plate 200 when the movable latch 110 is moved to the second receiving area A2.

As indicated in FIG. 4A and FIG. 4B, the first engaging portion 116 has a first inclined surface 116a, and the second engaging portion 210 has a second inclined surface 210a. The first inclined surface 116a is parallel to the second inclined surface 210a, and the second inclined surface 210a is located on a moving path of the first inclined surface 116a. Thereby, when the movable latch 110 moves from the first receiving area A1 to the second receiving area A2, the turning portion 114 is guided by the first and second inclined surfaces 116a and 210a, such that the second engaging portion 210 can be well engaged with the first engaging portion 116 which is located between the turning portion 114 and the elastic arm 112.

The electronic device 10 further includes a battery module 400. The case 100 further has a third receiving area A3, and the third receiving area A3 and the first receiving area A1 are respectively located at two sides of the case 100, so as to assemble the battery module 400 to the third receiving area A3. In particular, the assembled battery module 400 and the plate 200 are located at two respective sides of the movable latch 110, and the turning portion 114 of the movable latch 110 has a protruding rib 114a that extends toward the battery module 400. Namely, as long as the user disassembles the battery module 400 from the third receiving area A3 of the case 100, the movable latch 110 is exposed outside the case 100. The user can visually observe the turning portion 114 and the protruding rib 114a that are on the movable latch 110 and can then directly exert a force on the protruding rib 114a of the turning portion 114, so as to move the movable latch 110.

In light of the foregoing, the movable latch of the case in the electronic device can move back and forth according to the embodiments of the invention. Thereby, before the detachable member is assembled to the case, the movable latch is driven by the detachable member to move toward the second receiving area and to be locked to the plate, such that the detachable member can be placed on the case. After that, the movable latch is released from the plate and moved to the first receiving area to lock the detachable member. When the user intends to perform the assembling or disassembling process, the user can visually observe the movable latch in the electronic device so long as the user removes the battery module from the case of the electronic device. Hence, the user can assemble the detachable member to the case or disassemble the detachable member from the case without using additional tools, and the assembly/disassembly process of the electronic device becomes less difficult and more convenient.

Although the invention has been described with reference to the above embodiments, it will be apparent to one of ordinary skill in the art that modifications to the described embodiments may be made without departing from the spirit of the invention. Accordingly, the scope of the invention will be defined by the attached claims rather than by the above detailed descriptions.

What is claimed is:

1. An electronic device comprising:
a case having a first receiving area, a second receiving area, and a movable latch, the first receiving area being adjacent to the second receiving area, the movable latch being suitable for moving back and forth between the first receiving area and the second receiving area;
a plate assembled to the case and located in the second receiving area; and
a detachable member assembled to the first receiving area, wherein the movable latch locks the detachable member to the case when the movable latch is located in the first receiving area, and the movable latch is locked to the plate when the movable latch moves to the second receiving area, wherein the movable latch has an elastic arm, a turning portion, and a first engaging portion, the turning portion and the first engaging portion are located on the elastic arm, and the turning portion is suitable for receiving a force to drive the elastic arm, such that the first engaging portion moves back and forth between the first receiving area and the second receiving area.

2. The electronic device as recited in claim 1, wherein when the movable latch is locked to the plate, an orthogonal projection of the movable latch in the second receiving area is located within an orthogonal projection of the plate in the second receiving area.

3. The electronic device as recited in claim 2, wherein when the movable latch is locked to the plate, the plate covers the movable latch in the second receiving area.

4. The electronic device as recited in claim 1, wherein the plate has a second engaging portion extending toward the second receiving area of the case, and the first and second engaging portions are engaged when the movable latch moves to the second receiving area, such that the movable latch stops in the second receiving area.

5. The electronic device as recited in claim 4, wherein the first engaging portion is one of a latching hole and a protrusion, and the second engaging portion is the other one of the latching hole and the protrusion.

6. The electronic device as recited in claim 1, wherein the first engaging portion has a first inclined surface, the second engaging portion has a second inclined surface, the first inclined surface is parallel to the second inclined surface, and the second inclined surface is located on a moving path of the first inclined surface.

7. The electronic device as recited in claim 1, wherein the movable latch has a third engaging portion, the third engaging portion is located at one side of the elastic arm, and the turning portion and the first engaging portion are located at the other side of the elastic arm.

8. The electronic device as recited in claim 7, wherein the detachable member has a fourth engaging portion corresponding to the third engaging portion, and the third engaging portion is engaged with the fourth engaging portion when the movable latch is located in the first receiving area.

9. The electronic device as recited in claim 1, further comprising a battery module, the case further having a third receiving area, the third receiving area and the first receiving area being respectively located at two sides of the case, the battery module being suitable for being assembled to the third receiving area.

* * * * *